Feb. 23, 1926.  1,574,203
H. G. NALL
APPARATUS FOR ADJUSTING LITHOGRAPHIC MACHINE DAMPING ROLLERS
Filed April 29, 1925
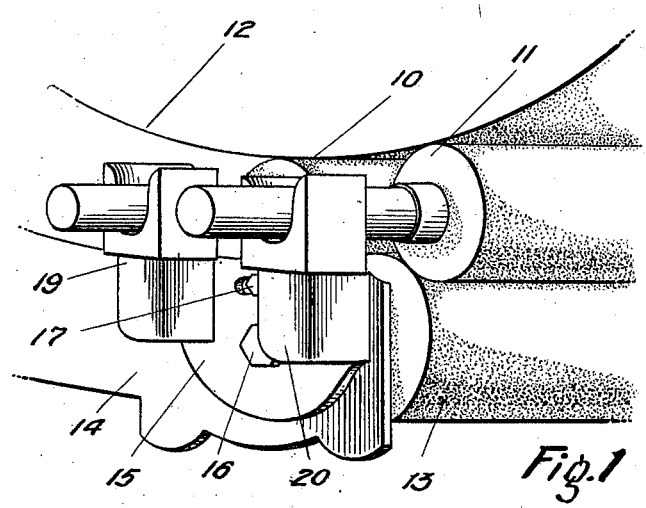
Fig.1
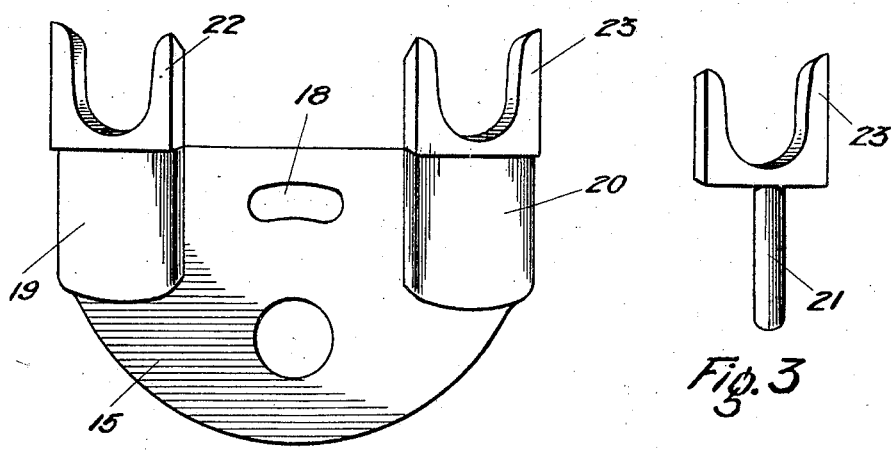
Fig.2
Fig.3
INVENTOR:
Harry Greaves Nall
BY: Ruege, Boyce & Bakelee
ATTORNEYS.

Patented Feb. 23, 1926.

1,574,203

UNITED STATES PATENT OFFICE.

HARRY GREAVES NALL, OF SYDNEY, NEW SOUTH WALES, AUSTRALIA.

APPARATUS FOR ADJUSTING LITHOGRAPHIC-MACHINE DAMPING ROLLERS.

Application filed April 29, 1925. Serial No. 26,583.

*To all whom it may concern:*

Be it known that I, HARRY GREAVES NALL, a subject of the King of Great Britain and Ireland, residing at Reservoir Street, Sydney, New South Wales, Australia, have invented new and useful Improvements in Apparatus for Adjusting Lithographic-Machine Damping Rollers, of which the following is a specification.

This invention relates to apparatus by which the pressure on the plate damping rollers mounted between the plate cylinder and the brass damping roller of a lithographic machine is automatically adjusted and evenly distributed between the plate damping rollers and retained with a minimum of effort and of time by the machine operator.

On each of the lever arms controlling the vertical movements of the brass damping roller is mounted a bracket which is adapted to be oscillated in a vertical plane about a pin and, preferably, about the spindle of the brass roller. Each bracket is provided with a horizontally projecting flange or lugs bored vertically to carry the stems of detachable bearings for the spindles of the damping rollers.

A curved slot is cut in each bracket to receive a set screw carried by the lever arm so that the brackets may be locked in adjusted position on the lever arms.

In the drawings:—

Fig. 1 is a fragmentary perspective view showing a bracket in position on the end of one of the control levers;

Fig. 2 is a front elevation of a bracket; and

Fig. 3 is a perspective view of a bearing for a plate damping roller.

Plate damping rollers 10, 11 are mounted between the plate cylinder 12 and the brass damping roller 13, the three rollers and the cylinder being of usual construction.

On each of the levers 14 which control the vertical movements of the brass roller 13 is mounted a bracket 15 which is adapted to be oscillated about the spindle 16 of the roller 13 and to be locked in adjusted position by means of a set screw 17 carried by the lever 14 and projecting through a slot 18 in the bracket.

Each bracket 15 is provided with two lugs 19, 20 which are bored vertically to carry the stems 21 of bearings 22, 23 for the damping rollers 10, 11.

To set the damping rollers 10, 11 so that the pressure between the cylinder 12 and the brass roller 13 is evenly distributed on the rollers 10, 11 the set screw 16 at each side of the machine is loosened and the plate cylinder 12 rotated. If the pressure on one of the rollers 10, 11 is greater than that on the other the brackets 15 are oscillated with the result that the pressure is evenly distributed between the rollers 10, 11. The screws 17 are then tightened.

The pressure adjusting operation is thus performed in a minimum of time and with minimum effort on the part of the machine operator and no further adjustments are required as the distribution of pressure is positively even, thus ensuring the minimum supply of moisture from the brass roller 13 to the cylinder 12.

The working faces of the bearings 22, 23 are constructed to prevent lateral movement of the spindles of the rollers 10, 11 but do not take any vertical thrust from these spindles.

By the use of the above construction identity of diameter of the rollers 10, 11 is not essential.

I claim:—

1. Apparatus for adjusting and evenly distributing the pressure on the plate damping rollers mounted between the plate cylinder and the brass damping roller of a lithographic machine comprising a bracket adapted to be oscillated on the control lever at each end of the brass damping roller, and a bearing for each plate damping roller mounted on the bracket.

2. Apparatus for adjusting and evenly distributing the pressure on the plate damping rollers mounted between the plate cylinder and the brass damping roller of a lithographic machine comprising a bracket adapted to be oscillated in a vertical plane on the control lever at each end of the brass damping roller, a set screw adapted to lock each bracket on its control lever, and a bearing for each plate damping roller mounted on the bracket.

3. Apparatus for adjusting and evenly distributing the pressure on the plate damping rollers mounted between the plate cylinder and the brass damping roller of a lithographic machine comprising a bracket adapted to be oscillated in a vertical plane on the control lever at each end of the brass damping roller, a pair of lugs on each bracket, and a detachable bearing for each plate damping roller carried by each lug.

In testimony whereof I have signed my name to this specification.

HARRY GREAVES NALL.